United States Patent [19]

Cologna et al.

[11] Patent Number: 5,190,611
[45] Date of Patent: Mar. 2, 1993

[54] BEARING LOAD RESTORATION METHOD FOR COMPOSITE STRUCTURES

[75] Inventors: Rudy L. Cologna, Bellevue; Everett A. Westerman, Jr., Auburn, both of Wash.

[73] Assignee: The Boeing Company, Seattle, Wash.

[21] Appl. No.: 654,938

[22] Filed: Feb. 13, 1991

[51] Int. Cl.$^5$ ............................................. B32B 35/00
[52] U.S. Cl. .................................. 156/98; 29/402.11; 156/94; 264/36; 428/63
[58] Field of Search ................. 156/98, 94; 29/402.11, 29/402.09; 52/514; 428/63; 244/131, 133; 264/36

[56] References Cited

U.S. PATENT DOCUMENTS

| | | |
|---|---|---|
| 379,510 | 3/1888 | Eynon . |
| 1,569,490 | 1/1926 | Hiscock . |
| 2,198,167 | 4/1940 | Harman . |
| 2,229,878 | 1/1941 | Wilson . |
| 2,278,334 | 3/1942 | Scott . |
| 2,415,905 | 2/1947 | Overton . |
| 2,506,233 | 5/1950 | Murphy . |
| 2,570,588 | 9/1951 | Nylund ............................... 156/98 |
| 2,583,396 | 1/1952 | Skoog ................................. 156/98 |
| 2,786,264 | 3/1957 | Colombo ............................ 29/401 |
| 3,101,764 | 8/1963 | Gruber ............................... 152/367 |
| 3,251,721 | 5/1966 | Johnson ............................. 156/97 |
| 3,487,530 | 1/1970 | Ely ..................................... 52/514 |
| 3,902,940 | 9/1975 | Heller, Jr. et al. ................... 156/98 |
| 3,986,913 | 10/1976 | Walz ................................... 156/98 |
| 4,152,877 | 5/1979 | Green ................................. 52/514 |
| 4,311,656 | 1/1982 | Spriggs ............................... 264/36 |
| 4,434,540 | 3/1984 | Cappelli ............................. 29/402.11 |
| 4,463,044 | 7/1984 | McKinney ......................... 428/107 |
| 4,517,038 | 5/1985 | Miller ................................. 156/98 |
| 4,554,036 | 11/1985 | Newsom ............................. 156/94 |
| 4,560,428 | 12/1985 | Sherrick et al. .................... 156/94 |
| 4,620,407 | 11/1986 | Schmid .............................. 52/741 |
| 4,820,564 | 4/1989 | Cologna et al. .................... 52/514 |
| 4,824,500 | 4/1989 | White et al. ....................... 156/281 |
| 4,894,971 | 1/1990 | Cortese .............................. 52/514 |

FOREIGN PATENT DOCUMENTS

| | | | |
|---|---|---|---|
| 0972934 | 8/1975 | Canada ................................. | 156/98 |
| 1109869 | 6/1961 | Fed. Rep. of Germany . | |
| 72698 | 4/1960 | France . | |
| 1171582 | 11/1969 | United Kingdom . | |
| 1381276 | 1/1975 | United Kingdom . | |
| 2201122 | 8/1988 | United Kingdom ............ | 156/306.6 |

OTHER PUBLICATIONS

"Repair of Composites", Klein A. J.; *Advanced Composites* Jul./Aug. 1987, pp. 50-62.
*Encyclopedia of Chemical Technology*; Kirk-Othmer 1981 vol. 4 pp. 17-18, vol. 17, p. 405.

Primary Examiner—Michael W. Ball
Assistant Examiner—Danniel J. Stemmer
Attorney, Agent, or Firm—Joan H. Pauly; Glenn D. Bellamy

[57] ABSTRACT

Material is removed from a panel (10) in the region surrounding an undesired opening (12) caused by damage or incorrect forming or wear of a fastener hole. The resulting prepared opening (21) has a bearing load transmitting sidewall surface that is substantially perpendicular to the outer surface (11) of the panel (10) and tapers slightly in an inward direction relative to the surface (11). The prepared opening (21) may extend all the way through the panel (10) or only part way through. A prefabricated insert (22) is positioned in the prepared opening (21) and bonded to the load transmitting surface. The bonding may be accomplished by applying an adhesive or using a fusing procedure. The insert (22) may have a constant angle of taper, preferably about two degrees, or may be concavely curved in the direction of taper. The insert (22) may be trimmed prior to and/or following the bonding procedure. A new fastener hole may be drilled through the bonded insert (22). The snug fit of the insert (22) and the nearly perpendicular orientation of the inset/panel interface result in the direct transmission of bearing loads between the panel (10) and the insert (22) in the repaired area.

16 Claims, 2 Drawing Sheets

BEARING LOAD RESTORATION METHOD FOR COMPOSITE STRUCTURES

TECHNICAL FIELD

The present invention relates to the repair and/or re-sizing of holes in panels of composite material and, in particular, to the provision of a repair method which implants an insert in the panel to restore bearing load capacity to the panel around a damaged area or a mislocated or mis-sized fastener hole.

BACKGROUND ART

As used herein, the term "bearing loads" refers to loads in a panel or other structure substantially parallel to the plane (flat or curved) of the panel or other structure. In the case of loads around a fastener hole, "bearing loads" refers to loads essentially perpendicular to the axis of the hole and/or the shank of a fastener received in the hole.

It is known to fabricate structural panels from a composite material comprising layers of reinforcing fibers (e.g. graphite fibers) within a resin matrix. The use of such composite materials for making structural and nonstructural aircraft parts is well-known and widely recognized for its benefit of providing high strength with low weight.

Damage to an aircraft, such as damage caused by projectiles, can result in holes in composite material panels. In addition, fastener holes may be mislocated or oversized due to misdrilling or wear. A standard way of repairing, relocating, or resizing such holes, known as the "scarf" method, is to form a relatively wide, tapered recess in the composite material around the hole. Disk-shaped layers of fiber reinforced/resin matrix composite material, of different diameters, are set into the recess to form a patch. The fibers of each layer are generally oriented at a different angle than the fibers of adjacent layers for strength. The layers are secured in place by the use of a high shear strength adhesive.

The standard "scarf" method has a number of drawbacks. Practicing the method requires a highly trained technician. In order for the patch to properly carry bearing loads, especially around fastener holes, the fibers in each layer must be oriented in a bearing load plane. This orientation is very difficult to accomplish. The adhesives used require a long cure time, usually in combination with applied heat and pressure. In addition, the method converts the original bearing load to an adhesive shear load since the repaired area relies almost totally on the adhesive to transfer the design load across the repair. This is due to the wide angle of taper and the resulting orientation of the interface between the patch and the parent structure, which deviates substantially from an orientation perpendicular to the bearing load. When a fastener hole must be formed in the repaired area, the orientation of the patch fibers is particularly critical in order to assure the load-bearing integrity of the repaired panel. Moreover, the wide taper angle may cause other fastener holes to be within the radius of the scarf patch. This is especially likely when the panel or other structure is relatively thick. The load bearing integrity around these other holes may also be affected, and the other holes will generally require redrilling.

DISCLOSURE OF THE INVENTION

The present invention provides a method of restoring bearing load capability to a fiber reinforced/resin matrix composite material panel which has an undesired opening in it. As used herein, the term "undesired opening" includes any undesired opening, hole, or other interruption in a surface of the panel. The opening, hole, or other interruption may be a result of damage to the panel, misdrilling, mis-sizing, or wearing of a fastener hole, or some other cause. The term includes openings, holes, and other interruptions that extend only part of the way through the panel, as well as those which extend all the way through the panel.

According to the invention, the method comprises removing material from the panel in a region surrounding the undesired opening to form a prepared opening having a predetermined size and shape. The prepared opening is sized to encompass the undesired opening and is shaped to present an interior bearing load transmitting surface. This surface is substantially perpendicular to an outer surface of the panel and has an angle of taper in an inward direction relative to the outer surface. A prefabricated insert of composite material is provided. The insert is sized and shaped to at least substantially fill the prepared opening. The insert has sufficiently high compression strength, and fits sufficiently snugly in the prepared opening, and the angle of taper is sufficiently small, to allow bearing loads to be transmitted directly from the insert to the panel and from the panel to the insert. The method comprises positioning the insert in the prepared opening and bonding it to the load transmitting surface.

The method may also include additional steps. One such step is the forming of an opening of desired size, shape, and position in the panel through the positioned and bonded insert. Most commonly, this step would involve the forming of a fastener hole through the insert to, for example, replace a mis-sized fastener hole or relocate a misplaced fastener hole.

The configuration of the prepared opening may vary. The opening may extend all the way, or only partly, through the panel. It is generally preferred that the load transmitting surface be substantially circular in cross section and taper inwardly from a maximum diameter at the outer surface of the panel. In one embodiment, the load transmitting surface is concavely curved in the inward direction relative to the outer surface of the panel. This configuration may provide some adjustability of fit of the insert within the prepared opening and increases the area of surface-to-surface contact between the insert and the material of the panel. In another embodiment, which is currently preferred because of its relative simplicity, the load transmitting surface has an essentially constant angle of taper. The most preferred angle of taper is about two degrees.

The preferred manner of carrying out the steps of positioning and bonding the insert comprises introducing the insert into the prepared opening and determining what trimming, if any, is required. The insert is removed from the prepared opening and trimmed, as necessary. Then, the insert is repositioned in the prepared opening and bonded to the load transmitting surface. This preferred procedure has the advantage of allowing a reasonable, relatively limited number of sizes of prefabricated inserts to be used to repair undesired openings with a much wider variety of sizes. In combination with the slight taper of the insert, the procedure helps ensure that the insert fits snugly in a prepared opening to efficiently transmit bearing loads across the interface between the insert and the surrounding panel material.

In the practice of the method of the invention, there is considerable flexibility in the manner in which the step of bonding the insert is carried out. The bonding may be accomplished by positioning an adhesive between the insert and the load transmitting surface. The bonding may also be carried out by fusing the insert to the load transmitting surface. In situations in which the prepared opening has a round cross section, the step of fusing may include rotating the insert in the prepared opening to generate heat. Other means of accomplishing the fusion may also be used, such as laser and inductive heating.

The method of the invention has many advantages. The carrying out of the method does not require a high level of skill. In addition, the method may be accomplished with access to only one side of the panel or other structure being repaired. The use of a prefabricated insert facilitates improved load carrying capability of the insert relative to the parent panel structure. When bonding the insert involves the use of adhesives, high shear strength adhesives are not required. The bonding can be accomplished using adhesives that are storable at room temperature and that can be cured using relatively quick and easy procedures without sacrificing the quality of the repair. In an area of a panel that has been repaired in accordance with the invention, the bearing load transfer is highly reliable and efficient. The use of a relatively slight taper angle in the practice of the method helps avoid involvement of nearby fastener holes in the repair process, even when the panel being repaired is relatively thick. The method of the invention is highly versatile and may be used to repair a variety of types of undesired openings and under a wide range of repair conditions. The many advantages of the invention result in the ability to extend the useful life of a panel or other structure requiring repair in a reliable and cost effective manner.

Other advantages and features of the invention are hereinafter discussed as part of the description of the illustrated embodiments.

BRIEF DESCRIPTION OF THE DRAWINGS

In the drawings, like element designations refer to like parts throughout, and.

BEST MODES FOR CARRYING OUT THE INVENTION

Figure 1:
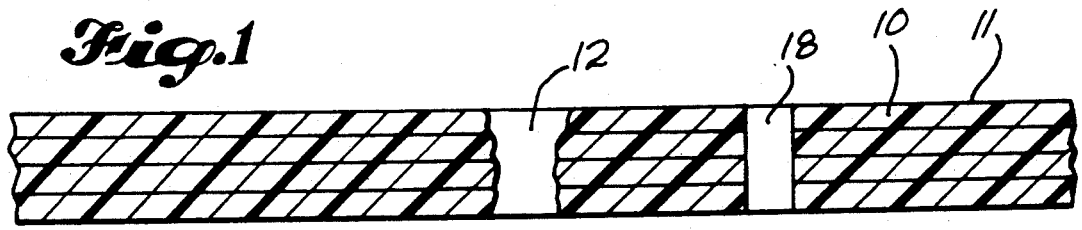
FIG. 1 is a fragmentary sectional view of a panel constructed from a composite material, showing a damaged area.

The drawings illustrate the best modes for carrying out the method of the invention currently known to the applicants. In the drawings, the repair of a flat panel is illustrated. It is intended to be understood that the method may also be used to repair undesired openings in panels having various curved configurations.

Figure 2:
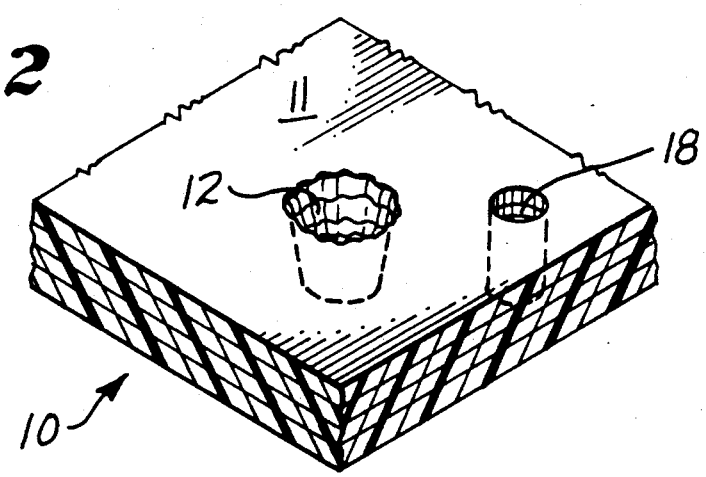
FIG. 2 is a fragmentary pictorial view of the panel portion shown in FIG. 1.

The method of the invention is a method of restoring bearing load capability to a fiber reinforced/resin matrix composite material panel or other structure in which there is an undesired opening, as defined above. FIGS. 1 and 2 illustrate a panel region 10 of an aircraft that has been damaged by an object passing through it, producing an undesired opening 12 which is irregular in shape. FIGS. 5–8 illustrate the use of the invention for repairing the opening 12. For the purposes of illustrating the invention, the opening 12 may be considered to be either a damage hole or a fastener hole which has been improperly formed or mislocated or which has become worn. The basic steps of the method of the invention are the same regardless of the manner in which the undesired opening has been formed.

Figure 4:
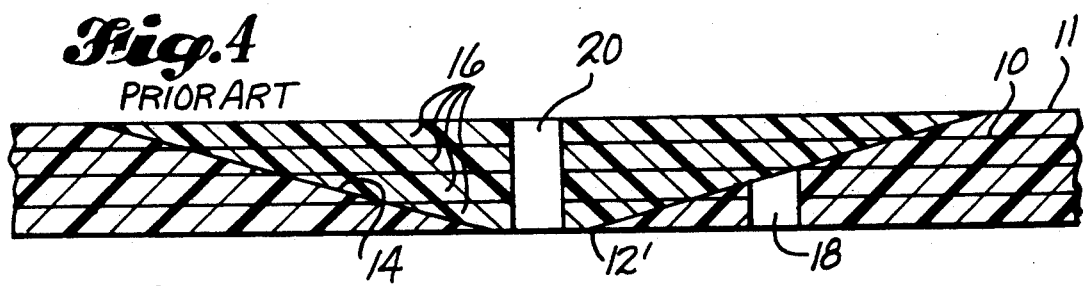
FIG. 4 is an assembled sectional view of the repair illustrated in FIG. 3.
Figure 3:
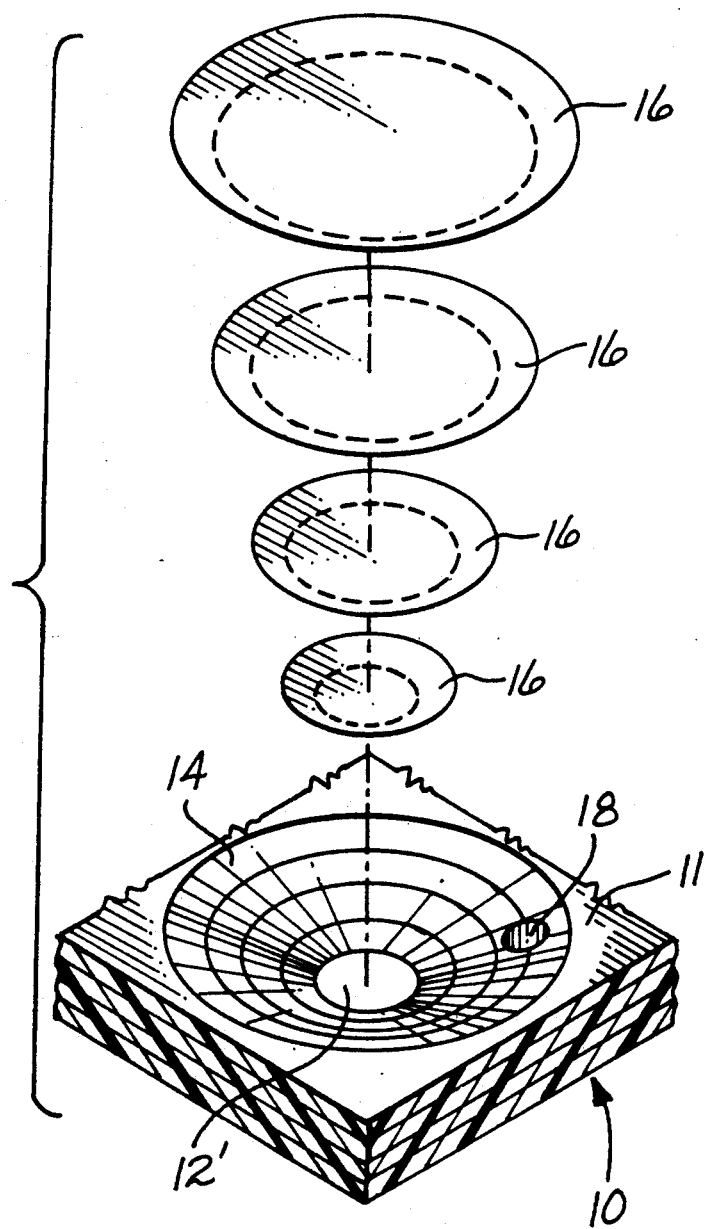
FIG. 3 is an exploded pictorial view illustrating a prior art repair system.

For the purposes of comparison, FIGS. 3 and 4 illustrate the known "scarf" method described above. The undesired opening 12 is initially dressed to give it a smoothly curving border, i.e. make it round. A widely tapered recess 14 is formed, such as by sanding, on the outer side 11 of the panel 10 around the dressed opening 12', as illustrated in FIG. 3. Composite material layers 16 of different diameters are set into the recess 14 with the fibers of each layer 16 being oriented at a different angle than the fibers of the adjoining layer or layers 16. The layers 16 are secured in place by the use of a high shear strength adhesive. The adhesive is cured, usually by applying heat and pressure over an extended period of time. FIGS. 3 and 4 illustrate one of the significant drawbacks of the scarf method, i.e. the effect on closely-spaced, adjacent fastener holes 18. The overlap of the adjacent hole 18 and the recess 14 further compromises the structural integrity of the panel 10 and necessitates the redrilling of the adjacent fastener hole 18, as well as the hole 20 at the site of the undesired opening 12. If more than one repair is needed in a region of a panel, the use of the scarf method could unacceptably weaken the panel structure and thereby make it necessary to scrap and replace the entire panel.

Figure 5:
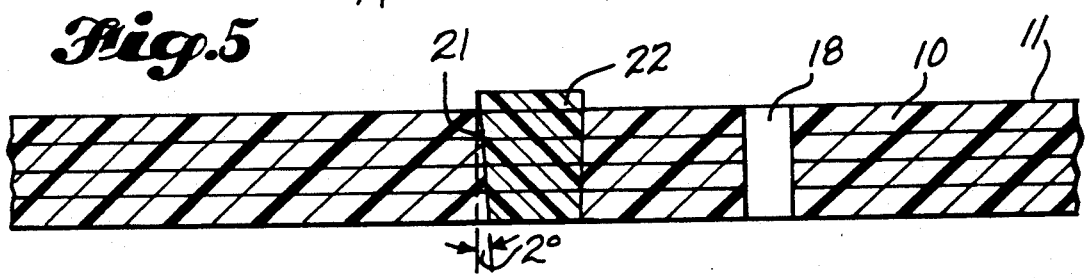
FIGS. 5 and 6 are sectional views of a panel, illustrating two stages of the preferred embodiment of the method of the present invention.
Figure 6:
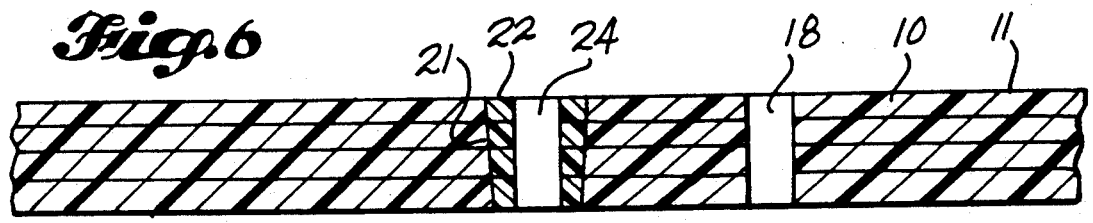
Figure 7:
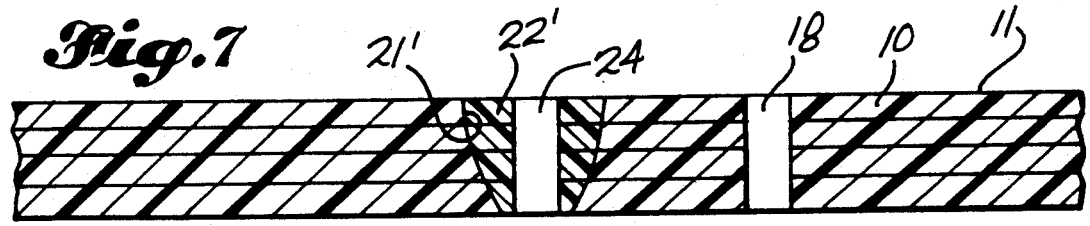
FIG. 7 is a sectional view like FIG. 6 except that it shows a modified form of the insert configuration.
Figure 8:
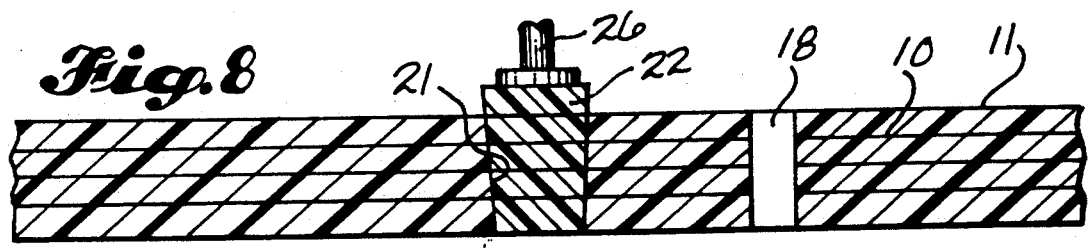
FIG. 8 is a sectional view similar to FIG. 5, illustrating the use of a breakaway shank for fusing the insert to the panel material.

The method of the present invention begins with the step of initially dressing the irregular, misplaced, or mis-sized opening 12 to give it a smoothly curving border. This initial step improves the stress pattern in the material surrounding the opening 12. Material is removed from the panel 10 in the region surrounding the undesired opening 12 to form a prepared opening 21, 21' having a predetermined size and shape and encompassing the undesired opening 12. The steps of dressing the opening 12 and forming the prepared opening 21, 21' are preferably carried out simultaneously. In preferred form, the prepared opening 21, 21' has a circular cross section and a small angle of taper in an inward direction relative to the panel's outer surface 11. In other words, the opening 21, 21' tapers in diameter from a slightly larger surface opening at the outer surface 11 of the panel 10 to a slightly smaller surface opening on the opposite side of the panel 10. The amount of taper is relatively slight, preferably being at approximately two degrees from normal to the outer surface 11 of the panel 10, as shown in FIG. 5. The taper of the opening 21, 21' may be linear, as shown in FIG. 5, or nonlinear, as in the case of the concavely curved taper shown in FIG. 7. The opening 21 shown in FIGS. 5, 6, and 8 is formed with a conical or frustoconical drilling bit, whereas the opening 21' shown in FIG. 7 is formed with a drilling bit having a work surface that is rounded in the longitudinal direction. The sidewall of each of the illustrated prepared opening configurations is substantially perpendicular to the outer surface 11 of the panel 10 and is shaped to present an interior bearing load transmitting surface.

After the prepared opening 21, 21' has been formed, an insert 22, 22' of prefabricated material corresponding to the size and shape of the opening 21, 21' is selected from a stock of prefabricated inserts. As shown in FIGS. 5, 6, and 8, the insert 22 has a frustoconical configuration. As shown in FIG. 7, the insert 22' has a rounded shape to closely fit the rounded prepared opening 21'. The insert 22, 22' is preferably formed of a composite material of similar composition to the parent material of the panel 10. The material of the insert 22, 22' should have a relatively high compression strength to facilitate proper transfer of compression loads across the repaired region.

In the prefabrication procedure, the insert 22, 22' is preferably cut from a larger piece of composite material which has been laid up and cured using heat and pressure under a process similar to that used in constructing the composite panel 10. This preparation and curing process does not need to be performed on site and can be done well in advance of the time of the repair to the panel 10. In this manner, the insert 22, 22' is completely prefabricated, being cured and cut, prior to installation according to the present method. This allows inserts of various predetermined sizes and shapes to be prepared and stocked for ready installation. The precuring of the insert also avoids shrinkage of the insert, due to curing, during the panel repair procedure. In addition, the prefabrication procedure permits a high degree of accuracy in orienting the reinforcing fibers of an insert to be substantially normal to a fastener opening 24 (FIGS. 6 and 7) which may be subsequently formed in the insert 22, 22'.

It is very important that the sizes and shapes of the prepared opening 21, 21' and insert 22, 22' correspond very closely in order to provide a snug fit and ensure that the insert 22, 22' at least substantially fills the prepared opening 21, 21'. Therefore, the insert 22, 22' is fitted to the opening 21, 21' prior to bonding the insert 22, 22' to the opening sidewalls. Since it is desirable for each prefabricated size and shape of the inserts to be usable for repairing openings of various sizes in panels of various thicknesses, the fitting procedure may require trimming of the prefabricated insert. The insert is initially introduced into the prepared opening 21, 21' to determine what, if any, trimming is required. The insert is then removed and trimmed, as necessary. For example, it may be determined that a portion of the narrower end of the insert must be trimmed in order to prevent the insert from extending beyond the surface of the panel opposite the outer surface 11. This might be required in a situation in which fastening requirements or interior structures around the repair site do not permit protrusion of the insert beyond the inner surface of the panel 10. Another situation in which it might be necessary to trim the narrow end of the insert is one in which the insert is being positioned in a blind prepared opening that does not extend all the way through the panel 10. In such a situation, it would be necessary for the insert to snugly engage the prepared opening sidewalls before it bottomed out on the blind end of the prepared opening. Generally, a small space between the inner end of the insert and the blind end of the opening could be tolerated. The outer, wider end of the insert could also be trimmed at this stage of the method to make it conform to the outer surface 11 of the panel 10. However, trimming of the outer end is, in most oases, preferably deferred until a later stage of the repair process. FIG. 5 illustrates a bonded insert 22 prior to the final trimming.

Once any necessary trimming has been completed and the fit of the insert 22, 22' has been verified, the insert 22, 22' is repositioned in the prepared opening 21, 21' and bonded to the bearing load transmitting surface of the opening sidewall. The taper of the insert 22, 22' allows the snugness of the fit in the prepared opening 21, 21' to be adjusted by adjusting the inward pressure on the insert 22, 22' as it is being positioned in the opening 21, 21'. The insert 22, 22' may be bonded in any of a variety of ways. For example, the step of bonding may be accomplished by positioning an adhesive between the insert 22, 22' and the opening sidewall. Because of the relatively slight taper of the insert/opening interface, low strength, fast curing adhesives may be used. Such adhesives are well-known and widely available for use with both thermoplastic and thermoset composite materials. The adhesive is applied to one or both of the interfacing surfaces of the insert and prepared opening. Then, the insert is positioned in the opening, and the adhesive is cured to bond the insert in the opening. Once the adhesive has cured, the outer end of the insert 22, 22' may be trimmed or dressed to make its outer surface a smooth and flush continuation of the outer surface 11 of the panel 10.

The bonding may also be carried out by softening the interfacing surface portions of the insert 22, 22' and the panel 10 to fuse the insert 22, 22' to the panel 10. The softening may be accomplished chemically or by the application of heat. The use of heat is particularly advantageous when the insert 22, 22' and the panel 10 are composed of thermoplastic composite materials. For example, thermoplastic inserts 22, 22' and panels 10 may be bonded through a welding or fusion process, such as laser bonding, inductive bonding, ultrasonic welding, or vibration welding.

A preferred method of using heat to fuse the components is spin welding. This type of process is well-known for use in fusing steel components, but, to the applicants' knowledge, has not heretofore been used for fusing composite materials. In general, spin welding is the generation of heat as a result of friction between a moving member and a stationary member until a temperature which is sufficiently high to fuse the members together is reached. Referring to FIG. 8, the insert 22 may be fitted with a shank 26 for high speed rotation about its central axis by an external motor not shown). The shank 26 may be fitted to the insert 22 in a manner which allows it to break away or release upon the occurrence of a predetermined torque, indicating that the insert 22 is sufficiently fused to the load transmitting surface of the panel 10. Alternatively, a torque-limiting coupling of well-known construction may be used to chuck the shank 26 to the drive motor. When the predetermined torque level is reached, indicating that the insert 22 is sufficiently fused to the panel 10, the shank 26 and insert 22 are no longer spun. The shank 26 may be removed from the insert 22 by shearing off the portion of the insert 22 which protrudes beyond the outer surface 11 of the panel 10.

Whatever bonding procedure is used, once the insert 22, 22' is properly bonded to the panel structure 10, the outside surface is trimmed and/or dressed in order to ensure that the outer surface of the repaired panel is smooth and flush across the area of repair, as shown in FIGS. 6 and 7. If a fastener opening 24 or the like is to be formed through the bolded insert 22, 22', the opening 24 may be drilled or otherwise formed, taking care to provide proper location, shape, and sizing of the opening 24. If the opening is intended to reposition the original opening 12, care should be taken that the insert 22, 22' is of sufficient diameter to encompass both the original opening 12 and the new opening 24. FIGS. 6 and 7 illustrate completed repairs with fastener openings 24 formed through the bonded inserts 22, 22'.

The repair process of the present invention restores the capacity of the panel 10 to withstand shear in the panel 10 and is particularly effective in restoring the capacity to carry compression-type bearing loads. This makes the method of the invention especially suitable for repairing panel portions which include or will include a fastener opening. When a fastener shank extends through a fastener opening in a panel, the shank creates compression bearing loads on the panel. In order to maintain the bearing load structural integrity of the panel, these compression bearing loads must be efficiently transmitted from the fastener to the insert and from the insert to the panel. The required efficient transmission of the loads is a major achievement of the present invention.

A significant feature of the invention is the forming of the prepared opening and the insert to have a very slight degree of taper. The slight degree of taper is sufficient to ensure that the insert fits snugly in the prepared opening when it is positioned therein. At the same time, the degree of taper is sufficiently small to allow bearing loads to be transmitted directly between the insert and the panel. The snugness of the fit and the slightness of the angle of taper cooperate to result in the direct transmission of bearing loads from the insert to the panel and from the panel to the insert. The reference to "direct" transmission of loads is intended to indicate that there is an essentially continuous load pathway across the repaired area with the bearing loads being transmitted across the insert/panel interface without a change in the nature of the load. Rather than converting the bearing load to an adhesive shear load, as in the known scarf method, the method of the invention produces a mechanical abutment that, in turn, creates the direct mechanical transmission of loads across the interface.

The slight degree of taper characteristic of the invention also helps minimize the area of the panel that is affected by the repair. The full thickness of the panel and the uninterrupted presence of the reinforcing fibers throughout the thickness remains intact around the point of repair up to a location very close to the original undesired opening 12. In contrast, the use of the scarf method results in a relatively large area of the panel having a diminished thickness and interruptions in the reinforcing fibers. The relatively wide extent of the repair area can seriously compromise the ability of the panel to carry tension, as well as compression loads. On the other hand, the use of the method of the invention allows structural loads across the panel in the vicinity of the repair to be largely carried by the unaffected parent panel material surrounding the repair. The relatively small extent of the repair area also helps to avoid the involvement of neighboring fastener openings 18, as illustrated in FIGS. 5-8.

The foregoing description sets forth examples of the invention, but does not define the scope of the invention. As deemed necessary, variations may be made in the practice of the method without departing from the spirit and scope of the invention. Possible variations include combining various steps of the invention for simultaneous operation, and/or performing a step by carrying out a plurality of substeps. The invention and patent protection is defined only by the following claims interpreted according to accepted doctrines of patent law.

What is claimed is:

1. A method of restoring bearing load capability to a fiber reinforced/resin matrix composite material panel having an undesired opening therein, said method comprising the steps of:

removing material from said panel in a region surrounding said undesired opening to form a prepared opening having a predetermined size and shape; said prepared opening being sized to encompass said undesired opening and being defined by a sidewall that presents an interior bearing load transmitting surface; said prepared opening having an outer end that opens onto an outer surface of said panel, an opposite inner end that opens onto an inner surface of said panel, a maximum width at said outer end, and a minimum width at said inner end; and said load transmitting surface being substantially perpendicular to said outer surface of aid panel, having an angle of taper in an inward direction relative to said outer surface, and tapering inwardly from said outer end to said inner end;

providing a prefabricated insert of composite material sized and shaped to at least substantially fill said prepared opening; said insert having sufficiently high compression strength, and fitting sufficiently snugly in said prepared opening, and said angle of taper being sufficiently small, to allow bearing loads to be transmitted directly from said insert to said panel and from said panel to said insert; and positioning said insert in said prepared opening and bonding it to said load transmitting surface.

2. The method of claim 1, wherein said load transmitting surface is substantially circular in cross section and tapers inwardly from a maximum diameter at said outer surface of said panel to a minimum diameter at said inner end.

3. The method of claim 2, wherein said load transmitting surface is concavely curved in said inward direction.

4. The method of claim 2, wherein said load transmitting surface has an essentially constant angle of taper from said outer end to said inner end.

5. The method of claim 4, wherein said constant angle of taper is about two degrees.

6. The method of claim 1, wherein said load transmitting surface is concavely curved in said inward direction.

7. The method of claim 1, wherein said load transmitting surface has an essentially constant angle of taper from said outer end to said inner end.

8. The method of claim 7, wherein said constant angle of taper is about two degrees.

9. The method of claim 1, in which the step of bonding said insert comprises positioning an adhesive between said insert and said load transmitting surface.

10. The method of claim 1, in which the step of bonding said insert comprises fusing said insert to said load transmitting surface.

11. The method of claim 2, in which the step of bonding said insert comprises fusing said insert to said load transmitting surface.

12. The method of claim 11, in which the step of fusing includes rotating said insert in said prepared opening to generate heat.

13. A method of correcting a fastener hole in a fiber reinforced/resin matrix composite material panel and of restoring bearing load capability to the panel, said method comprising the steps of:

removing material from said panel in a region surrounding said hole to form a prepared opening having a predetermined size and shape; said prepared opening being sized to encompass said hole and being defined by a sidewall that presents an interior bearing load transmitting surface; said prepared opening having an outer end that opens onto an outer surface of said panel, an opposite inner end, a maximum width at said outer end, and a minimum width at said inner end; and said load transmitting surface being substantially perpendicular to said outer surface of said panel, having an angle of taper in an inward direction relative to said outer surface, and tapering inwardly from said outer end to said inner end;

providing a prefabricated insert of composite material sized and shaped to at least substantially fill said prepared opening; said insert having sufficiently high compression strength, and fitting sufficiently snugly in said prepared opening, and said angle of taper being sufficiently small, to allow bearing loads to be transmitted directly from said insert to said panel and from said panel to said insert;

positioning said insert in said prepared opening and bonding it to said load transmitting surface; and forming a new fastener hole in said panel through the positioned and bonded insert.

14. The method of claim 13, wherein said load transmitting surface is substantially circular in cross section and tapers inwardly from a maximum diameter at said outer surface of said panel to a minimum diameter at said inner end.

15. The method of claim 14, wherein said load transmitting surface has an essentially constant angle of taper from said outer end to said inner end.

16. The method of claim 15, wherein said constant angle of taper is about two degrees.

* * * * *

UNITED STATES PATENT AND TRADEMARK OFFICE
CERTIFICATE OF CORRECTION

PATENT NO. : 5,190,611

DATED : March 2, 1993

INVENTOR(S) : Rudy L. Cologna and Everett A. Westerman, Jr.

It is certified that error appears in the above-identified patent and that said Letters Patent is hereby corrected as shown below:

```
Column 5, line 27, "out" should be -- cut --.
Column 6, line 10, "oases" should be -- cases --.
Column 6, line 58, "not shown)" should be -- (not shown) --.
Column 7, line 10 "bolded" should be -- bonded --.
Claim 1, column 8, line 34, "aid" should be -- said --.
```

Signed and Sealed this

Third Day of May, 1994

Attest:

BRUCE LEHMAN

Attesting Officer

Commissioner of Patents and Trademarks